Aug. 7, 1956 J. I. PANKOVE 2,757,475
SOUND-PRODUCING FISH AND GAME LURE
Filed May 13, 1954 2 Sheets-Sheet 1

INVENTOR.
JACQUES I. PANKOVE
BY Hoffman Stone
ATTORNEY

Aug. 7, 1956                J. I. PANKOVE                2,757,475
                    SOUND-PRODUCING FISH AND GAME LURE
Filed May 13, 1954                                      2 Sheets—Sheet 2

INVENTOR.
JACQUES I. PANKOVE
BY Hoffman Stone
ATTORNEY

United States Patent Office 2,757,475
Patented Aug. 7, 1956

2,757,475

SOUND-PRODUCING FISH AND GAME LURE

Jacques I. Pankove, Princeton, N. J.

Application May 13, 1954, Serial No. 429,509

6 Claims. (Cl. 43—17.1)

This invention relates to improved fish or game lures and, more particularly, to improved lures that produce sound vibrations and impart them to the water thereby to attract fish and aquatic game.

One object of the instant invention is to provide an improved sonic fish or game lure.

Another object is to provide an improved fish lure including, in a single, compact unit, improved energized means to produce sonic vibrations and means to impart said vibrations to an external medium.

An additional object is to utilize the rugged, compact convenience of semi-conductor electronic devices to provide an improved sonic lure.

Another object is to provide an improved electronically operated sonic fish lure.

A further object is to combine in an improved lure, energizable sonic vibrating means, and hooking or other game acquiring and restraining means.

These and other objects and advantages are accomplished in accordance with the instant invention to provide a fish or game lure including an electromechanical transducer driven by an electronic semi-conductor oscillator. According to a further feature of the invention the oscillator is energized by a low voltage battery including a pair of electrodes exposed on the surface of the device and utilizing the water as an electrolyte.

The invention will be described in greater detail by reference to the accompanying drawing, of which:

Similar reference characters are applied to similar elements throughout the drawing.

Figure 1:
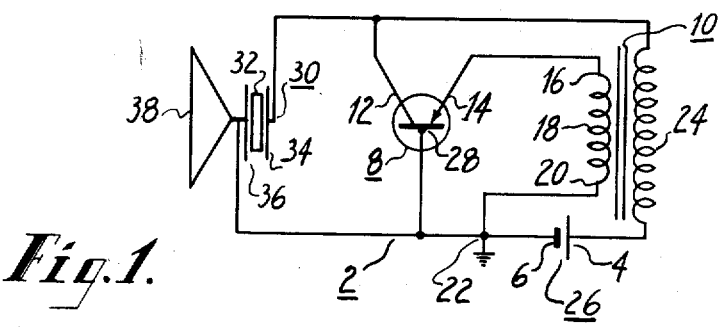
Figure 1 is a schematic circuit diagram of a device according to a preferred embodiment of the invention; and, Figure 2 is a schematic, cross-sectional, elevational view of the device illustrated in Figure 1.

A preferred embodiment of the invention comprises a fish or game lure 1 as shown in the drawing, including a transistor oscillator 2 and a pair of battery-forming electrodes 4 and 6. The oscillator comprises, for example, an alloy junction triode transistor 8 and a transformer 10 coupling together the collector and emitter electrodes 12 and 14, respectively, of the transistor. One end 16 of the primary winding 18 of the transformer is connected to the emitter electrode, the other end 20 of the primary winding being connected to a point 22 of reference potential referred to herein as ground. The secondary winding 24 of the transformer is connected between the collector of the transistor and, through a battery 26, to ground. The base 28 of the transistor is connected directly to ground.

A transducer 30 comprising a piezo-electric crystal element 32 and a pair of contact electrodes 34 and 36 is connected as a load device between the collector electrode 12 and ground. A diaphragm 38 is connected to the crystal element and exposed at the surface of the device to transmit the crystal vibrations and to impart them to the water when the device is in use. A number of typical transducer assemblies suitable for use in a fish lure according to the invention are described in a pamphlet entitled "Piezotronic Technical Data," published by Brush Electronics Company, Cleveland, Ohio. Those of the described assemblies which include vibratory diaphragms and which can be made watertight are preferred.

Figure 2:
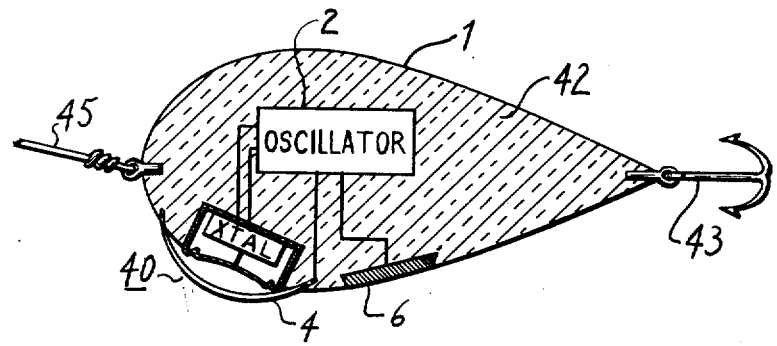
Figure 3:
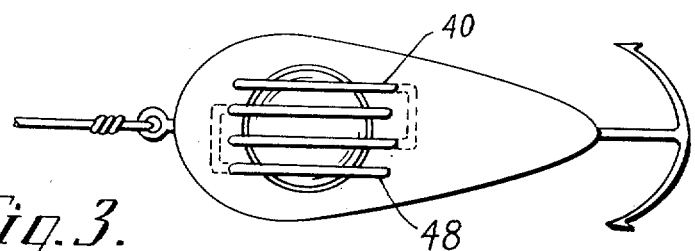
Figures 3, 4 and 5 are schematic views illustrating different respective embodiments of the invention.

The battery 26 comprises a pair of electrodes 4 and 6 having mutually different electrochemical potentials and which may be of silver and zinc, respectively. The water into which the device is immersed constitutes the battery electrolyte. The battery generates normally a potential of about 1 to 1.8 volts and a current of about 1 to 100 milliamperes depending upon the size of the electrodes and the current drain as determined by the transistor and other circuit constants. The salinity of the water also affects the efficiency and capacity of the battery, ocean or salt water being a preferred fishing medium because of its relatively high salt content. One of the electrodes of the battery may be in the form of a protective grill 40 covering the diaphragm. The second electrode may form another part 48 of the protective grill, as shown in Figure 3 or may consist of a strip of metal 6 disposed on the insulating surface of the device, spaced from the grill as shown in Figure 2.

The frequency of the electrical oscillations produced by the circuit of the device may be determined principally by the resonance characteristics of the transformer, according to well known principles. The transducer is preferably selected and proportioned to resonate at about the same frequency as the oscillator in order to operate at maximum efficiency. Utilizing known alternative transistor oscillator circuits and selecting known transducer parameters, the frequency of the vibrations produced by the device may be controlled within a relatively wide range including the entire range audible to the human ear and probably the entire range audible to fishes. According to presently accepted information about fish, for example, a frequency of about 600 to 1000 cycles per second is recommended as being most likely to attract fish to attack the lure.

Figure 4:
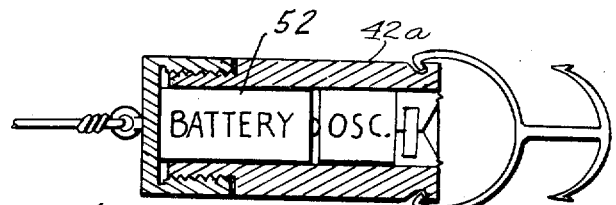
Figure 5:
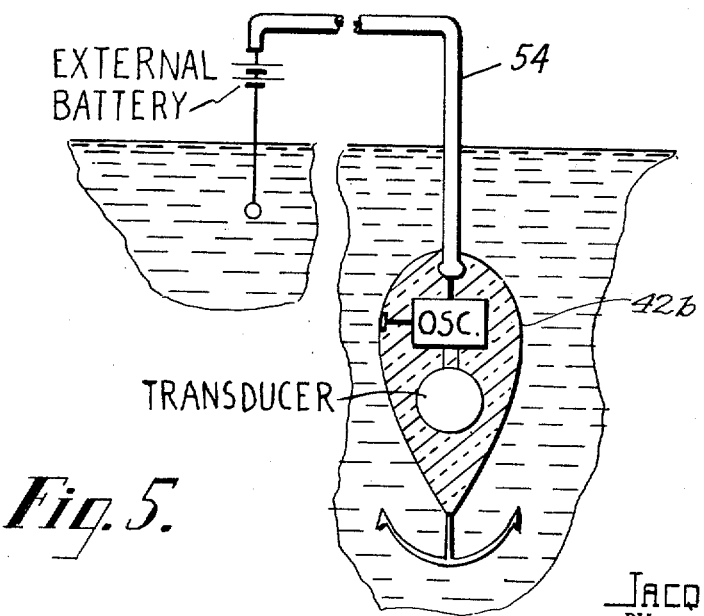

The circuit elements of the device are preferably encased in a body member 42, this member also being identified by the reference characters 42a and 42b, respectively, in the modifications shown in Figs. 4 and 5, respectively. In Figs. 2 and 5 the body member may be made of a thermosetting resin, which forms an ovoid shaped body having a fish hook 43 attached to one end and provision for attaching a line 45 to the other end. The entire body may be of any desired size since the circuit elements may be made relatively small and compact. The use of the water as an electrolyte simplifies the construction of the device and allows the lure to be operated continuously for relatively long periods of time without maintenance. An ordinary fish line may be used with the lure. No external power source is required, and consequently, no conductive electrical leads need be provided to connect an external source to the lure.

The instant invention is not limited to the exact oscillator circuit described heretofore, but any transistor oscillator may be utilized that is capable of operation by a relatively low voltage power source. The general principles of the design of oscillators utilizing transistors are explained in detail in Chapter 13 of a book edited by R. F. Shea, entitled "Principles of Transistor Circuits" (John Wiley & Sons, 1953).

Similarly, any transducer element capable of operating at a desired fish or game-attracting frequency may be utilized in place of the piezo-electric crystal heretofore described. For example, self-biased magnetic transducers may be readily adapted to operate in conjunction with known transistor oscillators. It is only necessary that the transducer be of a relatively small size and relatively high efficiency so that the entire device is not unduly enlarged to encompass it.

The invention is, of course, not limited to devices comprising batteries of the type heretofore described. Alternatively, one or more small dry cells 52 may be included within the device to operate the oscillator, as shown in Figure 4, or a power source may be situated at a distance from the lure with a connecting lead 54 to the lure, as shown in Figure 5. This latter arrangement is less desirable, except in instances where relatively large power outputs are desired, because it necessitates the use of at least one insulated conducting line to connect the lure to the fisherman, and limits the flexibility of the gear. A dry cell included within the lure is less advantageous than the type of battery described in connection with the preferred embodiment because the dry cell must be replaced after a relatively short period of operation.

There have thus been described improved sound-producing fish lures comprising electronically actuated oscillatory means coupled to a fluid medium by an electromechanical transducer means.

I claim:

1. A fish and game lure for immersion in a body of water comprising a self-contained unit including a body member, electronic circuit means to produce electrical oscillations and electromechanical transducer means to convert said oscillations into mechanical vibrations and to impart said vibrations to said water.

2. A sonic fish lure for immersion in a body of water, said lure comprising a self-contained unit including a body member, an electrical oscillator circuit for producing electrical oscillations of a predetermined range of frequencies and transducer means for converting such electrical oscillations into mechanical vibrations of substantially the same frequency as said electrical oscillations, whereby to impart said vibrations to said water.

3. A sonic fish lure for immersion in a body of water, said lure comprising a self-contained unit including a body member, an electrical oscillator circuit for producing electrical oscillations of a predetermined range of frequencies, electrochemical means for energizing said circuit and transducer means for converting such electrical oscillations into mechanical vibrations of substantially the same frequency as said electrical oscillations, whereby to impart said vibrations to said water.

4. A sonic fish lure for immersion in a body of water, said lure comprising a self-contained unit including a body member, an electrical oscillator circuit for producing electrical oscillations of a predetermined range of frequencies, transducer means for converting such electrical oscillations into mechanical vibrations whereby to impart said vibrations to said water, and a pair of conductive electrodes exposed on the exterior of said unit, said electrodes having mutually different electrochemical potentials and being connected to said circuit whereby the difference between said potentials is utilized to energize said circuit when said lure is immersed in said water.

5. A sonic fish lure for immersion in a body of water, said lure comprising a self-contained unit including a body member, an electrical oscillator circuit for producing electrical oscillations of a predetermined range of frequencies, said circuit including a transistor, transducer means for converting said electrical oscillations into mechanical vibrations whereby to impart said vibrations to said water, and a pair of conductive electrodes exposed on the exterior of said unit, said electrodes being adapted to utilize said water as an electrolyte thereby to form an electrical battery when immersed in said water, and said electrodes being connected to said circuit to energize said circuit when said unit is immersed in said water.

6. A sonic fish lure for immersion in a body of water, said lure comprising a self-contained unit including a body member, a transistor oscillator circuit for producing electrical oscillations of a predetermined range of frequencies, transducer means for converting said oscillations into mechanical vibrations and to impart said vibrations to said water, electrical energizing means to energize said circuit, hook means attached to said unit to secure fish and game that attack said lure, and means for attaching a line to said unit thereby recoverably to suspend said lure in said water.

References Cited in the file of this patent

UNITED STATES PATENTS

| | | |
|---|---|---|
| 1,561,278 | Pupin | Nov. 10, 1925 |
| 1,809,713 | Kuhnert et al. | June 9, 1931 |
| 2,248,870 | Langevin | July 8, 1941 |

FOREIGN PATENTS

| | | |
|---|---|---|
| 673,826 | Great Britain | June 11, 1952 |